(12) United States Patent
Hori et al.

(10) Patent No.: US 6,888,447 B2
(45) Date of Patent: May 3, 2005

(54) OBSTACLE DETECTION DEVICE FOR VEHICLE AND METHOD THEREOF

(75) Inventors: Yoshihito Hori, Toyota (JP); Masakatsu Nonaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 2 days.

(21) Appl. No.: 10/364,402

(22) Filed: Feb. 12, 2003

(65) Prior Publication Data

US 2003/0160866 A1 Aug. 28, 2003

(30) Foreign Application Priority Data

Feb. 26, 2002 (JP) ........................................ 2002-050451

(51) Int. Cl.⁷ ................................................ B60Q 1/00
(52) U.S. Cl. .................... 340/435; 340/903; 348/148
(58) Field of Search ............................... 340/903, 435; 348/148, 149, 159; 701/301; 342/69–72, 195; 180/170

(56) References Cited

U.S. PATENT DOCUMENTS

| 5,386,285 | A  | * | 1/1995  | Asayama ................. 356/4.01 |
| 6,317,693 | B1 | * | 11/2001 | Kodaka et al. ............ 701/301 |
| 6,684,149 | B1 | * | 1/2004  | Nakamura et al. ........... 701/96 |
| 6,696,929 | B1 | * | 2/2004  | Igaki et al. ................ 340/435 |
| 6,708,087 | B1 | * | 3/2004  | Matsumoto ................... 701/1 |

FOREIGN PATENT DOCUMENTS

JP         A 8-156723        6/1996

* cited by examiner

*Primary Examiner*—Brent A. Swarthout
(74) *Attorney, Agent, or Firm*—Oliff & Berridge, PLC (57) ABSTRACT

An obstacle detection device for a vehicle that detects obstacles using a distance to an object calculated by image processing and a distance to the object calculated by radar ranging. This obstacle detection device includes a measuring portion that measures an amount of movement of the object at a predetermined interval of time by image processing and a measuring portion that measures an amount of movement of the object at a predetermined interval of time by radar ranging, and does not determine the object to be an obstacle when the two amounts of movement are not consistent.

13 Claims, 4 Drawing Sheets

OBSTACLE DETECTION DEVICE FOR VEHICLE AND METHOD THEREOF

INCORPORATION BY REFERENCE

The disclosure of Japanese Patent Application No. 2002-050451 filed on Feb. 26, 2002 including the specification, drawings and abstract are incorporated herein by reference in its entirety.

BACKGROUND OF THE INVENTION

1. Field of the Invention

The invention generally relates to an obstacle detection device for a vehicle, which is mounted in the vehicle, to help a driver become aware of obstacles and the like. More specifically, the invention relates to an obstacle detection device for a vehicle which minimizes the false recognition of objects that cause virtual images in a captured image.

2. Description of the Related Art

In recent years, the use of CCD cameras and millimeter wave radar has become widespread in order to help a driver become aware of obstacles and the like while driving. Typically, CCD cameras have the benefit of being able to detect lane markings and lights and the like on the road, but are inferior in terms of accuracy with far distances because they calculate distance using a captured image. On the other hand, millimeter wave radar has the benefit of being extremely accurate with distances, but can only detect objects that have a large reflection coefficient.

As a related obstacle detection device for a vehicle, an obstacle detection device for a vehicle such as that disclosed in Japanese Patent Laid-Open Publication No. 8-156723, for example, has been proposed. This obstacle detection device for a vehicle compares the distance to an object in front of the vehicle calculated from an image captured by a CCD camera with the distance to the object ranged by the millimeter wave radar, and then recognizes the object as an obstacle when the distances match. This obstacle detection device for a vehicle makes use of the strong points of the CCD camera and the millimeter wave radar to make up for their weak points, thus enabling reliable recognition of an obstacle.

This type of obstacle detection device for a vehicle compares the calculation results from the captured image with the measurement results from the millimeter wave radar at a predetermined interval of time (e.g., every 1s). When the results match such that a highly dangerous situation is detected, a warning is issued and the user is alerted. To prevent a collision, the user is alerted the instant that both the results match up and the obstacle enters an area where the danger of collision is high.

Even with an obstacle detection device for a vehicle that uses both a CCD camera and millimeter wave radar, however, there is a possibility that an object, with which there is no danger of collision, may be erroneously recognized as an obstacle due to a virtual image appearing on the image captured by the CCD camera.

More specifically, when there is a puddle on the road, or when the road surface on which the vehicle is running tends to reflect light, such as the road itself at night, a virtual image created by the reflection of the road surface may be captured on the image that is captured by the CCD camera. This virtual image is not a real object, and therefore will not be detected by the millimeter wave radar.

When there is a metal object such as a can, or a road joint or an uneven portion of the road, or a piece of metal in the same location as this virtual image, however, these are ranged by the millimeter wave radar. At this time, the calculation results from the captured image and the measurement results from the millimeter wave radar are consistent, so the obstacle detection device for a vehicle may recognize these metal objects as obstacles and issue an erroneous warning.

This type of erroneous warning may cause the user to distrust the obstacle detection device for a vehicle, thereby hurting the merchantability of the obstacle detection device for a vehicle.

SUMMARY OF THE INVENTION

Therefore, the invention thus provides an obstacle detection device for a vehicle capable of reliably discriminating between a virtual object of the kind described above and a real object, in which accuracy and reliability has been improved.

In order to achieve the foregoing, an obstacle detection device for a vehicle according to one aspect of the invention is provided with a first measuring portion and a second measuring portion having a respectively different characteristic, and which determines a distance between the vehicle and an object in the vicinity of the vehicle, and a controller that determines the object to be an obstacle if at least one of a displacement amount of the distance, displacement amount of a relative velocity or displacement amount of a relative acceleration between the object and the vehicle at a predetermined interval that was determined by the first measuring portion is consistent (i.e. substantially equal) with a distance between the obstacle and the vehicle that was determined by the second measuring portion with the same timing as the measurement by the first measuring portion.

Also, an obstacle detection method of the obstacle detection device for a vehicle includes determining by a first measuring portion a distance between the vehicle and an object, determining by a second measuring portion that has a different characteristic than the first measuring portion the distance between the vehicle and the object, and determining the object to be an obstacle when the values determined in the first measuring step are consistent with the values obtained from the second measuring step.

According to the aforementioned construction and method, erroneous recognition of the virtual image created by a reflection on the road surface, as an obstacle, is able to be minimized even when the virtual image is recognized by captured image processing.

BRIEF DESCRIPTION OF THE DRAWINGS

The foregoing and further objects, features and advantages of the invention will become apparent from the following description of preferred exemplary embodiments with reference to the accompanying drawings, wherein like numerals are used to represent like elements and wherein.

DETAILED DESCRIPTION OF PREFERRED EMBODIMENTS

Figure 1:
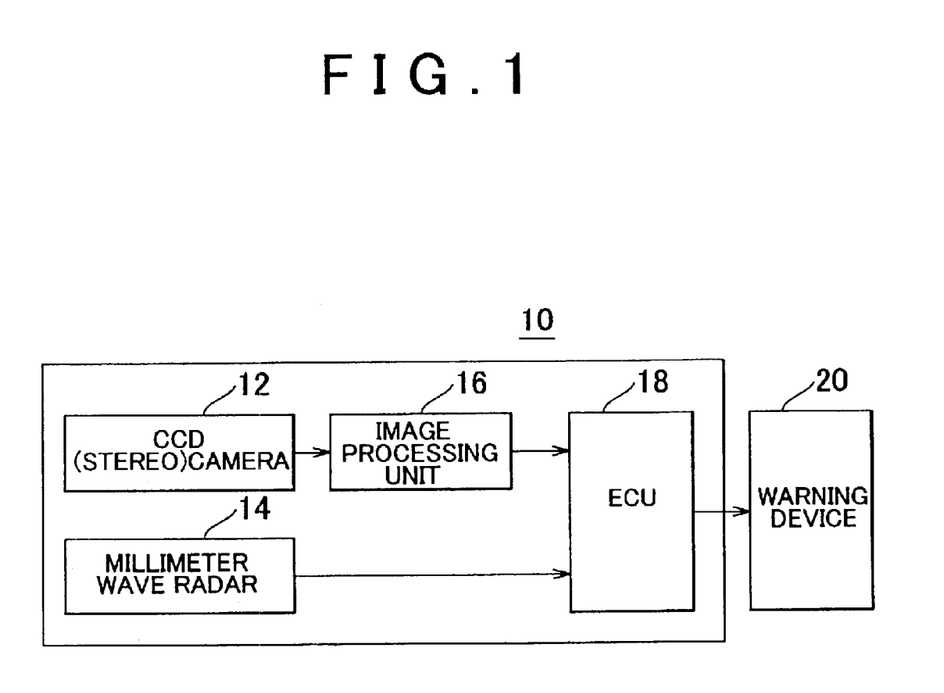
FIG. 1 is a block diagram of an obstacle detection device for a vehicle according to one exemplary embodiment of this invention.

FIG. 1 is a block diagram of an obstacle detection device 10 for a vehicle according to one exemplary embodiment of the invention. This obstacle detection device 10 for a vehicle is provided with a CCD (stereo) camera (image capturing portion) 12 as imaging means, an image processing unit 16 connected to the CCD camera 12, a radar ranging portion 14 as radar ranging means, and an electronic control unit (ECU) 18 connected to the image processing unit 16 and the radar ranging portion 14. A warning device 20 that issues a warning is also connected to this obstacle detection device 10 for a vehicle.

The CCD camera 12 is mounted so as to capture an image of an area in front of the vehicle, e.g., the CCD camera 12 is fixed near the rearview mirror inside the vehicle cabin. The image data of the image (hereinafter, this image will be referred to as "captured image") captured by the CCD camera 12 is sent to the image processing unit 16 at a predetermined interval of time.

The radar ranging portion 14 is mounted so as to range an object in front of the vehicle, e.g., the radar ranging portion 14 is mounted near the front grille of the vehicle. This radar ranging portion 14 is preferably a millimeter wave radar, which is relatively unaffected by weather conditions such as rain and fog, but may also be a laser radar. The radar ranging portion 14 emits radar waves toward a predetermined area in front of the vehicle and receives the waves reflected off of objects in that predetermined area, thereby obtaining radar information such as the velocity Vr, the distance Lr, and the direction θr of the object. For example, with a two-frequency CW (Continuous Wave) method, the radar ranging portion 14 may calculate the velocity Vr using a radar wave Doppler frequency, or it may calculate the distance Lr from the phase information of the two frequencies. Also, the radar ranging portion 14 may one-dimensionally or two-dimensionally scan the emitted beam and detect the direction θr of the object. This radar information is then sent to the electronic control unit 18.

The image processing unit 16 processes the image data from the CCD camera 12 and obtains the image information relating to the distance L, the direction θ, and the velocity V of the object in the captured image. This image information is sent to the electronic control unit 18. The image processing unit 16 may also recognize lane markings on the road and output only image information relating to the object in a specified area.

As will be described later in detail, the electronic control unit 18 determines the consistency of the radar information from the radar ranging portion 14 with the image information from the image processing unit 16 and determines an object relating to the consistent radar and image information to be an obstacle (an object with which the vehicle is in danger of colliding shall be referred to as "obstacle" in this specification) with which the vehicle is in danger of colliding.

Next, the image processing method of the image processing unit 16 will be described. The image processing method of the image processing unit 16 applied to this invention presupposes the calculation of distance from image data which does not include distance information.

Figure 2A:
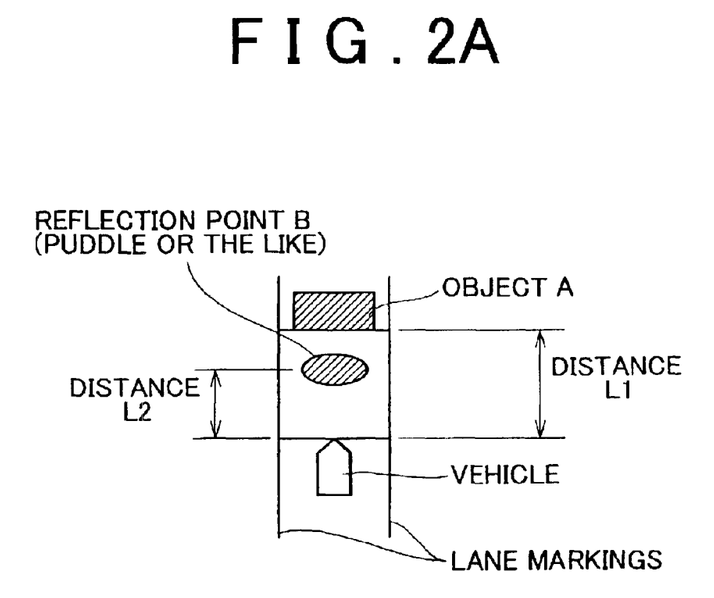
FIGS. 2A–2B are diagrams illustrating one exemplary embodiment of an image processing method of an image processing unit of the obstacle detection device for a vehicle shown in FIG. 1.
Figure 2B:
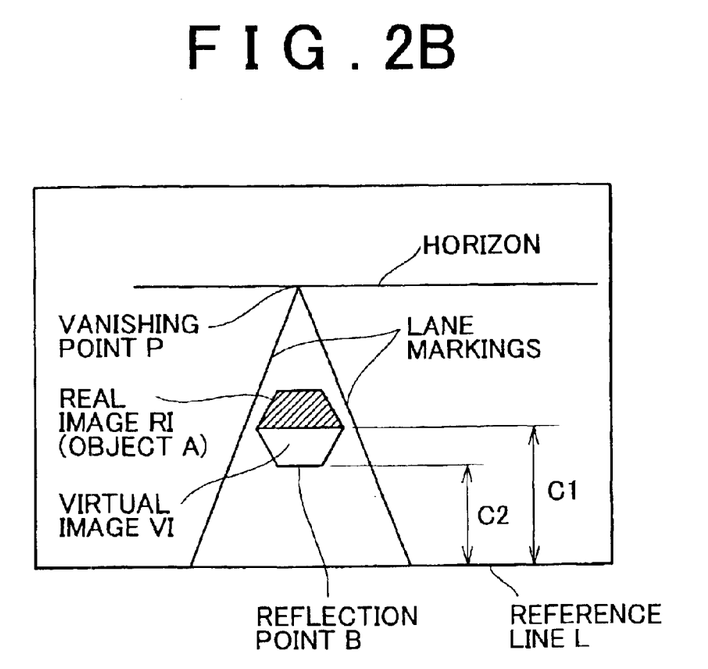

FIG. 2 is a diagram illustrating an exemplary embodiment of the image processing method of the image processing unit 16. FIG. 2A is a top view schematically showing the view when capturing the image. FIG. 2B is a view schematically showing the captured image corresponding to that view. FIG. 2B shows a virtual image VI of an object A on the captured image. This virtual image VI is created in the captured image by a reflection point B (e.g. a puddle) on the road shown in FIG. 2A. In FIG. 2A, a localized puddle is shown to make it easier to visualize in the figure. In FIG. 2B, the captured image when the puddle extends all the way to the object A is shown.

The distance calculation method by the image processing unit 16 calculates the distance from the difference on a two-dimensional coordinate system on the captured image containing a vanishing point P on the horizon. The distance calculation method also calculates the distance with respect to the object A using the closest point from a reference line L of a real image RI of the object A. That is, a distance C1 on the captured image is used in the distance calculation for the real image RI of the object A of the FIG. 2B. At this time, a distance L1 from the vehicle to the object A (see FIG. 2A) is in proportion to the distance C1 on the captured image, and is able to be realized as a linear function with C1 as a variable such that L1=f (C1).

Similarly, a distance C2 on the captured image can also be used in the distance calculation for the virtual image VI of the object A in FIG. 2B. At this time, a distance L2 from the vehicle to the reflection point B (see FIG. 2A) is in proportion to the distance C2 on the captured image, and is able to be realized as a linear function with C2 as a variable such that L2=f (C2).

The velocity calculation method by the image processing unit 16 is based on the distance calculation method. That is, when the real image RI of the object A has moved only a distance ΔC1 on the captured image in an interval of time ΔT, an amount of movement Vc1 of the real image RI of the object A per unit of time on the captured image is expressed as Vc1=ΔC1/ΔT. At this time, a velocity V1=ΔL1/ΔT (ΔL1 is the amount that the object A moved with respect to the vehicle in the interval of time ΔT) of the object A with respect to the vehicle can be expressed as a linear function with Vc1 as a variable such that V1=g(Vc1). This is based on the fact that the distance L1 from the vehicle to the object A is in proportion to the distance C1 on the captured image, as described above.

Similarly, with respect to the virtual image VI of the object A as well, when the virtual image VI of the object A has moved only a distance ΔC2 on the captured image in the interval of time ΔT, an amount of movement Vc2 of the virtual image. VI of the object A per unit of time on the captured image is expressed as Vc2=ΔC2/ΔT. At this time, a velocity V2=ΔL2/ΔT (ΔL2 is the amount that the reflection point B moved with respect to the vehicle in the interval of time ΔT) of the reflection point B with respect to the vehicle can be expressed as a linear function with Vc2 as a variable such that V2=g(Vc2).

The direction calculation method by the image processing unit 16 calculates using two-dimensional coordinates on the captured image. That is, this direction calculation method calculates both the vector from the location of the vehicle to the real image RI of the object A and the vector from the location of the vehicle to the virtual image VI of the object A, and then derives the direction θ1 of the real image RI and the direction θ2 of the virtual image VI with respect to the vehicle.

The thus obtained distance L1, the velocity V1, and the direction θ1 relating to the real image RI are consistent with the respective distance Lr1, the velocity Vr1, and the direction θr1 relating to the object A of the radar information. The term "consistent" in this specification is used in view of the fact that the value of the radar information and the value of the captured image will not match due to differences of calculation accuracy and the like. Therefore, the term "consistent" shall be considered to also include cases in which both values correspond in some manner, i.e., both values will be substantially equal in some matter.

In contrast, the radar ranging portion 14 fundamentally does not range the reflection point B such as a puddle. Accordingly, information consistent with the distance L2, the velocity V2, and the direction θ2 relating to the virtual image VI does not exist in the radar information of the radar ranging portion 14. As a result, the electronic control unit 18 does not determine the virtual image VI (reflection point B) to be an obstacle so a problem does not normally occur.

In addition to objects that will become obstacles, such as cars ahead and fallen objects, however, the radar ranging portion 14 outputs radar information regarding objects that will not become obstacles (hereinafter, this type of object shall be referred to as "non-obstacle C"), such as metal objects such as cans and steel sheet joints where roads and bridges meet and the like. Accordingly, when the obstacle detection device 10 for a vehicle is constructed to confirm the consistency of only information relating to the distance and direction between the radar information and the image information, as with the related art, that obstacle detection device 10 for a vehicle would erroneously recognize the non-object C as an obstacle when the non-object C is in the same location as the reflection point B.

On the other hand, with the obstacle detection device 10 for a vehicle, this kind of erroneous recognition is able to be minimized because the obstacle detection device 10 confirms the consistency, between the radar information and the image information, of the information relating to velocity as well as the consistency of the information relating to the distance and direction. This is based on the fact that the velocity V2 relating to the virtual image V (i.e., the reflection point B) in the image information is not consistent with a velocity Vr3 relating to the non-obstacle C in the radar information.

Next, the reason why the velocity V2 relating to the virtual image VI in the image information is not consistent with the velocity Vr3 relating to the non-obstacle C in the radar information will be explained in detail.

Figure 3:
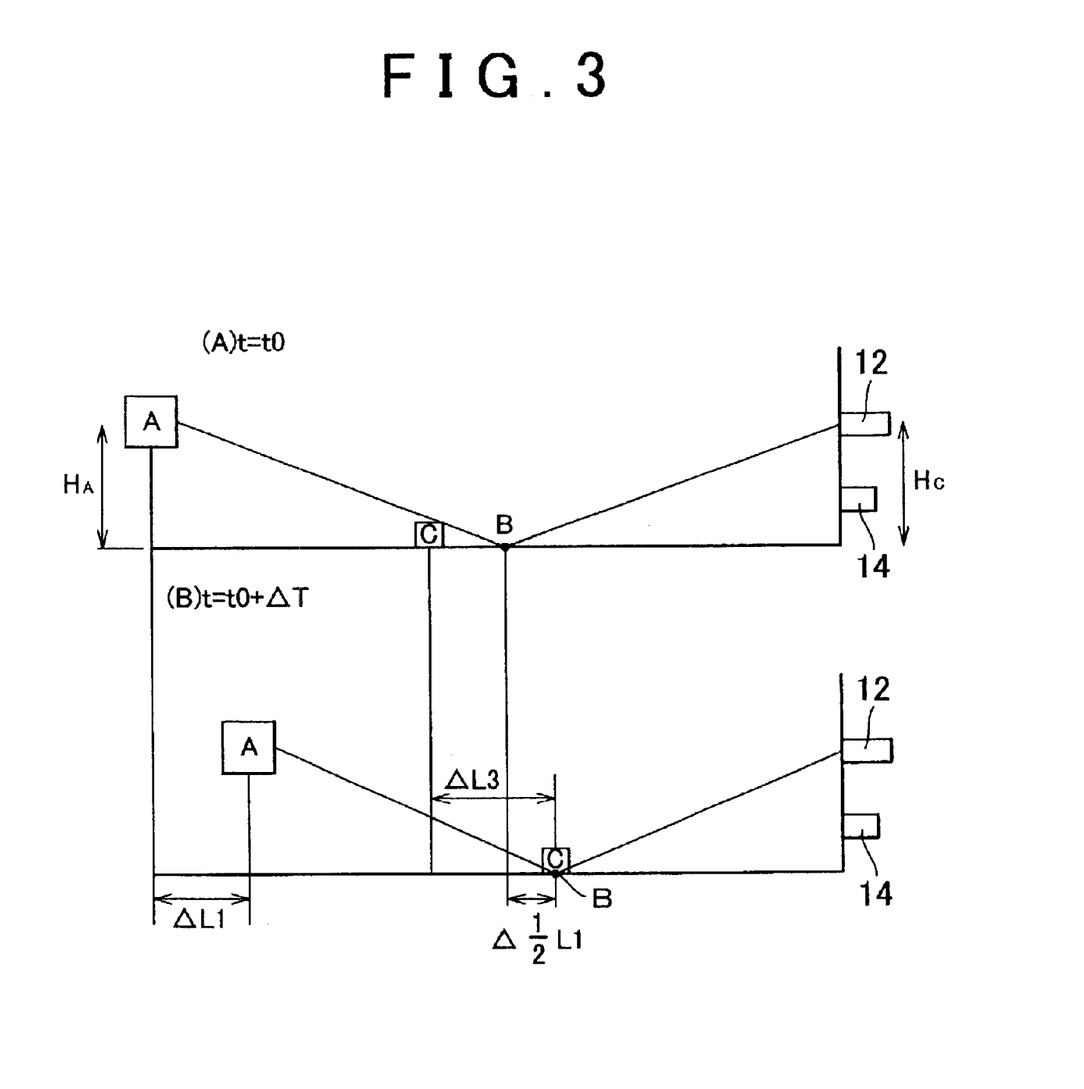
FIG. 3 is a graph schematically showing a state of the vehicle and the object at time $t=t0$ and time $t=t0+\Delta T$.

The upper graph in FIG. 3 schematically shows the states of the object A, the reflection point B, and the non-object C with respect to the CCD camera 12 at time t=t0. The lower graph in FIG. 3 schematically shows the states of the object A, the reflection point B, and the non-object C with respect to the CCD camera 12 at time t=t0+ΔT. To facilitate understanding, the height HC of the CCD camera 12 and the height HA of the obstacle A shall be made the same. Also, θL1 and θL3 in the lower graph of FIG. 3 denote the amounts of movement (the direction approaching the vehicle shall be positive) of the object A and the non-object C, respectively, with respect to the vehicle after the interval of time ΔT has passed. Accordingly, supposing that the non-object C is a stationary object, ΔL3 would show the absolute amount of movement of the vehicle at the interval of time ΔT.

The reflection point B always exists at a point midway between the CCD camera 12 and the object A, so the amount of movement ΔL2 of the reflection point B after the interval of time ΔT has passed becomes ΔL2=ΔL1/2. This ΔL2 is normally very different from ΔL3. For example, when ΔT=0.1s, the absolute velocity of the object A (assumed to be a preceding vehicle) is 40 km/h, and the absolute velocity of the vehicle is 60 km/h, then ΔL2=0.278 m and ΔL3=1.667 m.

This difference becomes more evident the greater the absolute velocity of the object A. When the absolute velocity of the object A becomes greater than the absolute velocity of the vehicle, the amount of movement ΔL2 of the reflection point B becomes negative and the difference becomes even more apparent. On the other hand, this difference becomes less the lower the absolute velocity of the object A. However, even if the absolute velocity of the object A is zero (i.e., even if the object A is stationary), the amount of movement ΔL2 of the reflection point B has a difference of ΔL3/2 with respect to the amount of movement ΔL3 of the non-object C.

Accordingly, because the difference between the amount of movement ΔL2 and the amount of movement ΔL3 is sufficiently large, the difference between the amount of movement Vc2 of the reflection point B (or more accurately, of the virtual image VI relating to the object A) per unit of time in the captured image and the amount of movement Vc3 of the non-obstacle C (or more accurately, the real image RI relating to the non-obstacle C) per unit of time becomes sufficiently evident even considering the relatively low accuracy of the image processing unit 16.

Therefore, the velocity V2 relating to the reflection point B in the image information becomes largely different from the velocity V3 relating to the non-obstacle in the image information, as is evident from the proportionality relation of V2=g(Vc2). This velocity V3 is consistent with the velocity Vr3 relating to the non-obstacle C of the radar information, so it is understandable that the velocity V2, which is largely different from the velocity V3, is largely different from the velocity Vr3 (i.e., the velocity V2 will not be consistent with the velocity Vr3).

In this way, because the velocity V2 of the reflection point B largely differs from the velocity Vr3 of the non-obstacle C, the obstacle detection device 10 for a vehicle according to this invention is able to reliably identity the difference between the reflection point B and the non-obstacle C at time t=t0+ΔT, regardless of whether the reflection point B and the non-obstacle C are in the same location.

Figure 4:
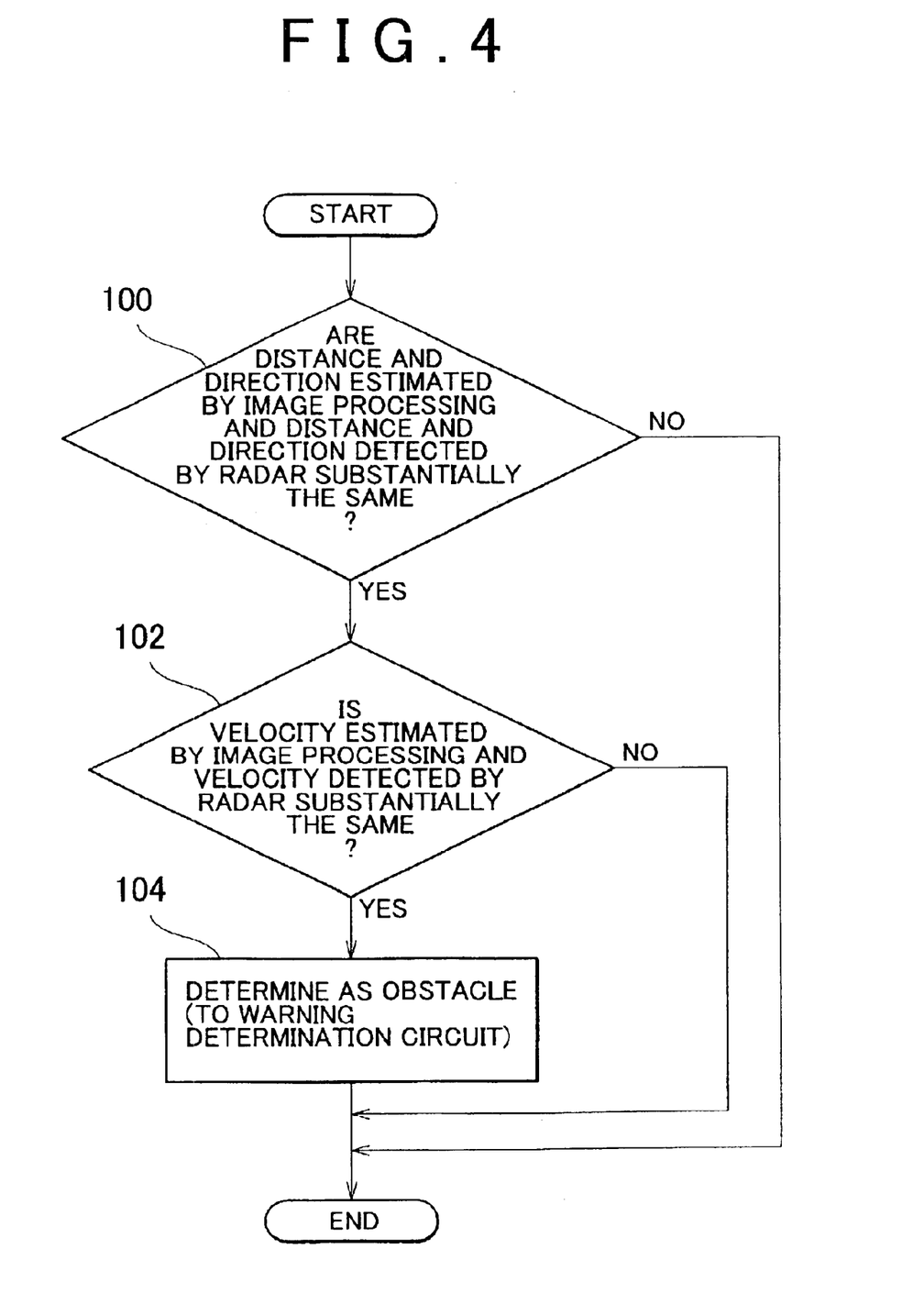
FIG. 4 is a flowchart showing a process of an electronic control unit of the obstacle detection device for a vehicle shown in FIG. 1 according to the invention.

Next, the process of the electronic control unit 18 of the obstacle detection device 10 for a vehicle according to the invention will be described in detail. FIG. 4 is a flowchart showing a process of the electronic control unit 18. The electronic control unit 18 receives radar information and image information at a predetermined interval of time ΔT. This process starts when the ignition switch is turned ON.

In step 100, the electronic control unit 18 determines whether the distance and direction of the radar information are consistent with the distance and direction of the image information. When consistency cannot be confirmed, for example, in the case where time t=t0 shown in the upper graph of FIG. 3, the electronic control unit 18 determines that an obstacle does not exist. When consistency is able to be confirmed, however, for example, in the case where time t=t0+ΔT shown in the lower graph of FIG. 3, the process proceeds on to step 102.

In step 102, the electronic control unit 18 determines whether the velocity of the radar information and the velocity of the image information are consistent. When consistency is able to be confirmed, the process proceeds on to step 104.

In step 104, the electronic control unit 18 determines the object A relating to the radar information and image information that are consistent to be an obstacle. At this time, it is preferable that the electronic control unit 18 further determine whether a warning should be issued considering the velocity of the vehicle, along with the location and velocity of the obstacle. Alternatively, the electronic control unit 18 may also send the determination results to a warning determination circuit that determines whether a warning should be issued. In this case, the warning determination circuit determines whether a warning should be issued considering the velocity of the vehicle, along with the location and velocity of the obstacle. The velocity of the vehicle may be input to the electronic control unit 18 from a vehicle speed sensor (not shown) that is connected to the electronic control unit 18. When the electronic control unit 18 has ultimately determined that a warning should be issued, it sends a signal to the warning device 20 instructing the warning device 20 to issue a warning.

On the other hand, when consistency cannot be confirmed in step 102, the electronic control unit 18 determines that an obstacle does not exist. Accordingly, erroneous recognition of the nonobstacle C as an obstacle can be reliably minimized even when the distance and direction of the reflection point B and the distance and direction of the non-object C are consistent (e.g., time t=t0+ΔT shown in the lower graph of FIG. 3).

In this way, according to the obstacle detection device 10 for a vehicle of this invention, determination of whether the object A is an obstacle is made by determining the consistency between the velocity of the radar information and the velocity of the image information, as well as the consistency between the distance and direction of the radar information and the distance and direction of the image information. Therefore, erroneous determination caused by the reflection point B on the road is able to be reliably minimized.

Also, according to the obstacle detection device 10 for a vehicle of this invention, because the determination of whether the object A is an obstacle is able to be made the instant (t=t0+ΔT) consistency between the distance and direction of the radar information and the distance and direction of the image information is able to be confirmed, a warning is also able to be issued at that instant (t=t0+ΔT). That is, there is no need for a process to prevent erroneous determination, such as a process to confirm whether consistency is still being maintained during a predetermined period of time (e.g., t=t0+3ΔT) from the time (t=t0+ΔT) consistency of the distance and direction between the radar information and the image information was able to be confirmed. This type of process to prevent an erroneous determination not only causes a delay in the issuance of a warning, which is undesirable from the viewpoint of ensuring passenger safety, but also increases the processing load on the electronic control unit 18.

The foregoing exemplary embodiment is based on the fact that the amount of movement ΔL2 of the reflection point B differs enough from the amount of movement ΔL3 of the non-obstacle C to be able to compensate for the relatively low distance calculation accuracy of the image processing unit 16. With the obstacle detection device 10 for a vehicle according to this invention, however, even in an exceptionally rare case in which there is almost no difference between the amount of movement ΔL2 of the reflection point B and the amount of movement ΔL3 of the non-obstacle C, problems do not occur.

Referring back to FIG. 3, this exceptional case occurs when the amount of movement ΔL3 of the non-obstacle C in the interval of time ΔT is substantially equal to the amount of movement ΔL2 (=ΔL1/2) of the reflection point B, i.e., when ΔL3 ≈ΔL1/2. In this case, the amount of absolute movement of the vehicle in the interval of time ΔT becomes approximately ΔL1/2. This is an extremely rare case in which the object A approaches (if the object A is a vehicle, that object A is running at the same speed as, but in the opposite direction of, the vehicle) the vehicle at an absolute velocity of approximately ΔL1/2ΔT, but nonetheless a case in which a collision needs to be avoided. In this case, even though the electronic control unit 18 erroneously recognizes the non-obstacle C to be an obstacle in step 104, there is not a problem with the warning being issued. If anything, the issued warning is effective in an extremely dangerous situation.

Further, another exceptional case occurs when both the absolute velocity of the object A and the absolute velocity of the vehicle are extremely low. For example, when the absolute velocity of the object A is zero, the amount of movement ΔL2 of the reflection point B has a difference of ΔL3/2 with respect to the amount of movement ΔL3 of the non-obstacle C. However, when the ΔL3 becomes extremely low, i.e., when the vehicle is running at an extremely slow speed, the difference (ΔL3/2) is extremely small. In this case, even though the electronic control unit 18 erroneously recognizes the non-obstacle C as an obstacle in step 104, the electronic control unit 18 determines whether a warning should ultimately be issued considering the velocity of the vehicle so an erroneous warning will not be issued.

The "first measuring portion" as a measuring device is realized by the image processing unit 16 disclosed in the exemplary embodiment. Also, in the same way, the "second measuring portion" is realized by the radar ranging portion 14 disclosed in the exemplary embodiment. Further, the "control portion" as a controller corresponds to the electronic control unit 18.

Although the invention has been described herein with reference to specific embodiments, many modifications and variations therein can be controlled. Accordingly, all such variations and modifications are included within the intended scope of the invention.

The image processing method of the image processing unit 16 was described above with reference to FIG. 2. It is to be understood, however, that the image processing method of the image processing unit 16 is in no way limited to this. For example, the distance calculation method of the image processing unit 16 may also obtain the distance to the object A by capturing the view using two of the CCD cameras 12 and obtaining the parallax between the captured images. In this case, the distance in the captured image may be calculated by a relational expression of distance=focal point of the lenses×distance between the cameras/parallax.

Also, the foregoing exemplary embodiment recognizes a difference between the virtual image and the object using the fact that the amount of movement of the virtual image on the image greatly differs from the amount of movement of the object that is in the same location as the virtual image. Alternatively, however, the difference between the virtual image and the real image can be recognized using the fact that the amount of movement of the virtual image on the image is half of the amount of movement of the real image relating to the virtual image (see the lower graph in FIG. 3). In this case, the information relating to the virtual image from the image information may also be excluded beforehand at the stage where a difference between the virtual image and the real image is recognized.

The foregoing exemplary embodiment compares a displacement amount of the distance from the vehicle to the object at a predetermined interval of time by image processing and a displacement amount of the distance from the vehicle to the object at a predetermined interval of time by radar ranging. Alternatively, a displacement amount of a relative velocity or a relative acceleration at a predetermined interval of time, instead of the displacement amount of the distance.

The invention as described above has the following effects. According to one aspect of the invention, erroneous recognition of a virtual image caused by a reflection on the road surface is able to be minimized, even if that virtual image is recognized by the captured image processing. That is, because the difference between the virtual image and the object is able to be reliably recognized using the fact that the amount of movement of the virtual image on the image greatly differs from the amount of movement of the object which is real, the object (or virtual image) will not be erroneously recognized as an obstacle even if the distance of the virtual image calculated by the captured image processing is consistent with the distance of the object calculated by the radar ranging. As a result, the obstacle detection device for a vehicle is not affected by virtual images, and therefore can recognize obstacles with high reliability.

Moreover, if necessary, at the instant the distance calculated by the captured image processing and the distance calculated by radar ranging are consistent, and the amount of movement calculated by the captured image processing and the amount of movement calculated by radar ranging are consistent, a warning can be issued to alert the user. That is, correct recognition can be instantly carried out without the need for a process of monitoring for a given period of time the consistency between the distance calculated by the captured image processing and the distance calculated by radar ranging in order to minimize erroneous recognition. As a result, it is possible to instantly alert the user in an emergency and obtain high accuracy without increasing the processing load.

The ECU 18 of the illustrated exemplary embodiments is implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing, various different specific computations, functions and other processes under control of the central processor section. The controller can be a plurality of separate, dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An obstacle detection device for a vehicle, comprising:
   a first measuring portion that determines a distance between the vehicle and an object in a vicinity of the vehicle;
   a second measuring portion that determines a distance between the vehicle and the object in the vicinity of the vehicle and has a different characteristic than the first measuring portion; and
   a controller that determines that the object is an obstacle when:
     the distance between the vehicle and the object determined by the first measuring portion and the distance between the vehicle and the object determined by the second measuring portion with the same timing used by the first measuring portion are consistent, and
     at least one of a displacement amount of the distance, a displacement amount of a relative velocity and a displacement amount of a relative acceleration at a predetermined interval of time from the vehicle to the object determined by the first measuring portion and a corresponding at least one of a displacement amount of the distance, a displacement amount of the relative velocity and a displacement of the relative acceleration from the vehicle to the object determined by the second measuring portion with the same timing used by the first measuring portion are consistent.

2. The obstacle detection device for a vehicle according to claim 1, wherein
   the first measuring portion determines the distance to the object and the at least one of the displacement amount of the distance, the displacement amount of the relative velocity and the displacement of the relative acceleration at a predetermined interval of time by image processing and
   the second measuring portion determines the distance to the object and the at least one of the displacement amount of the distance, the displacement amount of the relative velocity and the displacement of the relative acceleration at the predetermined interval of time by radar ranging.

3. The obstacle detection device for a vehicle according to claim 2, further comprising:
   a warning device that operates when the control portion has determined that the object is an obstacle.

4. The obstacle detection device for a vehicle according to claim 3, wherein
   the controller determines the object to be an obstacle and activates the warning device when:
     the distance and the direction of the object determined by the first measuring portion and the distance and the direction of the object determined by the second measuring portion are consistent, respectively, and
     the at least one of the displacement amount of the distance, the displacement amount of the relative velocity and the displacement of the relative acceleration determined by the first measuring portion and the at least one of the displacement amount of the distance, the displacement amount of the relative velocity and the displacement of the relative acceleration determined by the second measuring portion are consistent.

5. The obstacle detection device for a vehicle according to claim 2, wherein the radar ranging is conducted with a millimeter wave radar.

6. The obstacle detection device for a vehicle according to claim 2, wherein
the radar ranging is conducted with a laser radar.

7. The obstacle detection device for a vehicle according to claim 2, wherein
the image of the image processing is captured by at least one camera.

8. An obstacle detection method of an obstacle detection device for a vehicle, comprising:
determining, by a first measuring method, a distance between the vehicle and an object in a vicinity of the vehicle, and at least one of a displacement amount of that distance, a displacement amount of a relative velocity and a displacement amount of a relative acceleration;
determining, by a second measuring method that has a different characteristic than the first measuring method with the same timing used by the first measuring method, a distance between the vehicle and the object in the vicinity of the vehicle and at least one of a displacement amount of that distance, a displacement amount of a relative velocity and a displacement amount of a relative acceleration; and
determining the object to be an obstacle when:
the distance between the vehicle and the objection determined in the first measuring step and the distance between the vehicle and the objection determined in the second measuring step are consistent, and
at least one of a displacement amount of the distance, a displacement amount of a relative velocity and a displacement mount of a relative acceleration determined in the first measuring step and a displacement amount of the distance, a displacement amount of a relative velocity and a displacement mount of a relative acceleration determined in the second measuring step are consistent.

9. The detection method according to claim 8, wherein
the first measuring method is a determining method by image processing and the second measuring method is a determining method by radar ranging.

10. The detection method according to claim 8, further comprising:
issuing a warning when the object has been determined as an obstacle in the determining step.

11. The detection method according to claim 9, further comprising the steps of:
determining whether the distance between the vehicle and the object in the vicinity of the vehicle and a direction of the object with respect to the vehicle, which were determined in the first measuring step, are consistent with the distance between the vehicle and the object in the vicinity of the vehicle and the direction of the object with respect to the vehicle, which were determined in the second measuring step;
determining, when the distances and directions are consistent, whether the relative velocity of the vehicle and the object, which was determined in the first measuring step, are consistent with the relative velocity of the vehicle and the object, which was determined in the second measuring step; and
issuing a warning when the velocities are consistent.

12. An obstacle detection device for a vehicle that detects an obstacle using a distance to an object calculated by image processing and a distance to the object calculated by radar ranging, comprising:
a first measuring portion that calculates, by image processing, a displacement amount of relative velocity or a relative acceleration from the vehicle to the object at a predetermined interval of time;
a second measuring portion that calculates, by radar ranging, a displacement amount of the relative velocity or the relative acceleration at the predetermined interval of time; and
a control portion that determines the object to be an obstacle when the two displacement amounts of the relative velocity or the relative acceleration are consistent.

13. An obstacle detection method by an obstacle detection device for a vehicle, comprising the steps of:
calculating, by image processing, a displacement amount of a relative velocity or a relative acceleration from the vehicle to an object at a predetermined interval of time;
calculating, by radar ranging, a displacement amount of the relative velocity or the relative acceleration at the predetermined interval of time;
comparing the displacement amount of the relative velocity or the relative acceleration at a predetermined interval time of the object calculated by the image processing with the displacement amount of the relative velocity or the relative acceleration at a predetermined interval of time of the object measured by the radar ranging; and
determining the object to be an obstacle when the displacement amounts of the relative velocity or the relative acceleration are consistent.

* * * * *